No. 630,788. Patented Aug. 8, 1899.
A. WILKINSON.
CULTIVATOR.
(Application filed Jan. 4, 1896.)
(No Model.) 3 Sheets—Sheet 1.
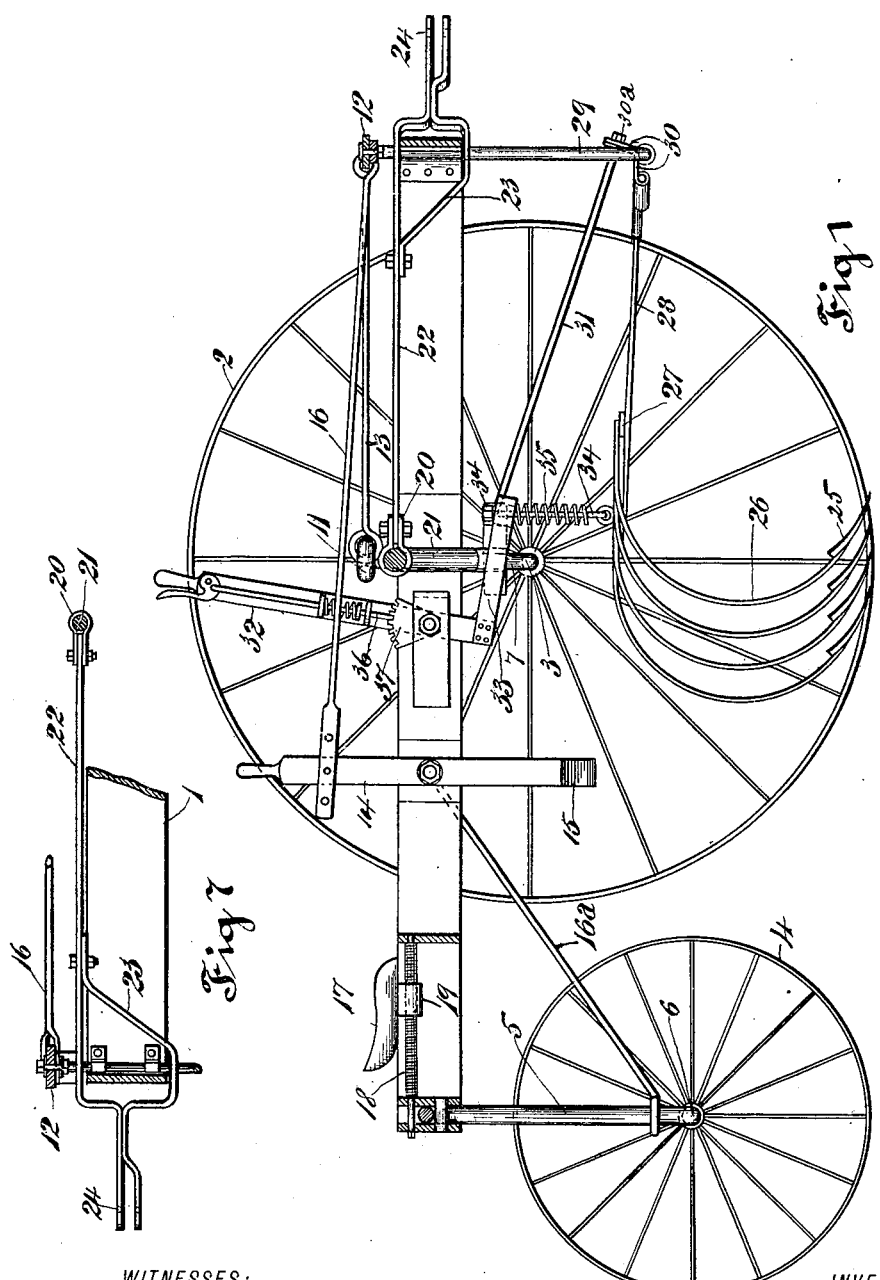
WITNESSES:
INVENTOR
Arnold Wilkinson
BY
Thompson R Bell
ATTORNEY.

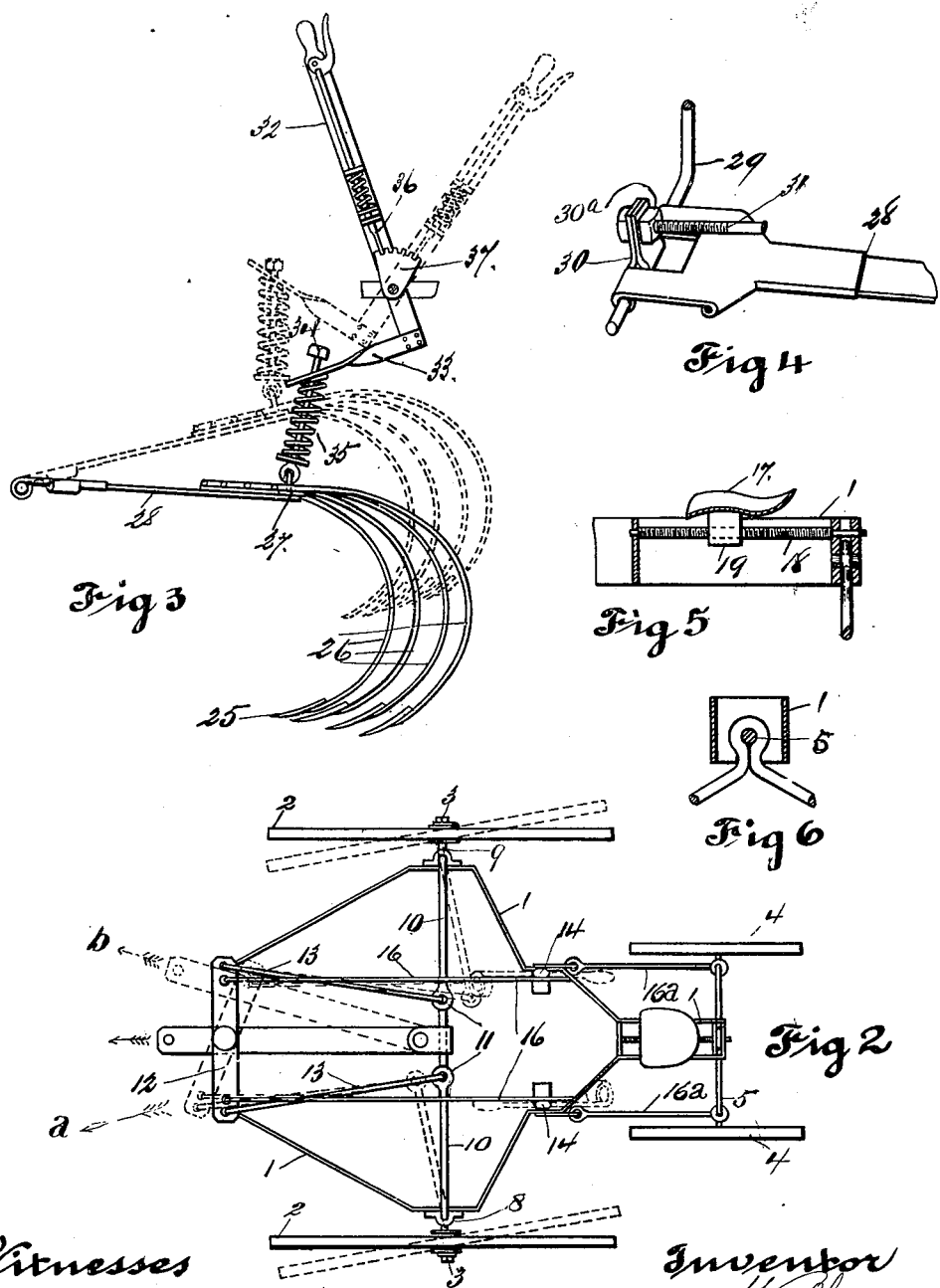

No. 630,788. Patented Aug. 8, 1899.
A. WILKINSON.
CULTIVATOR.
(Application filed Jan. 4, 1896.)
(No Model.) 3 Sheets—Sheet 3.
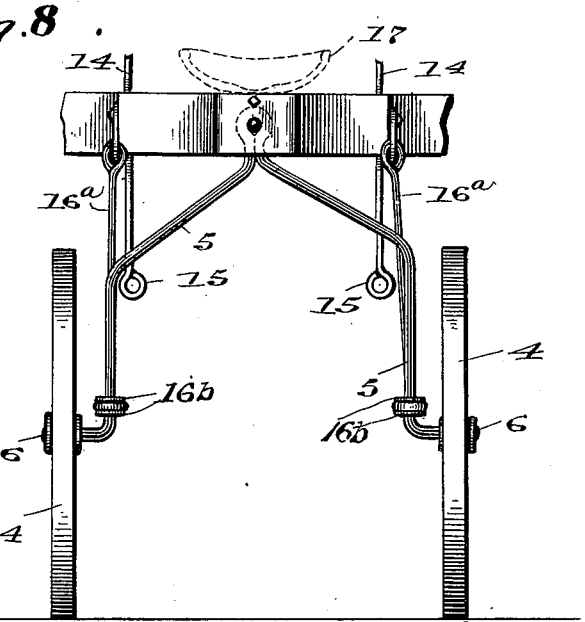
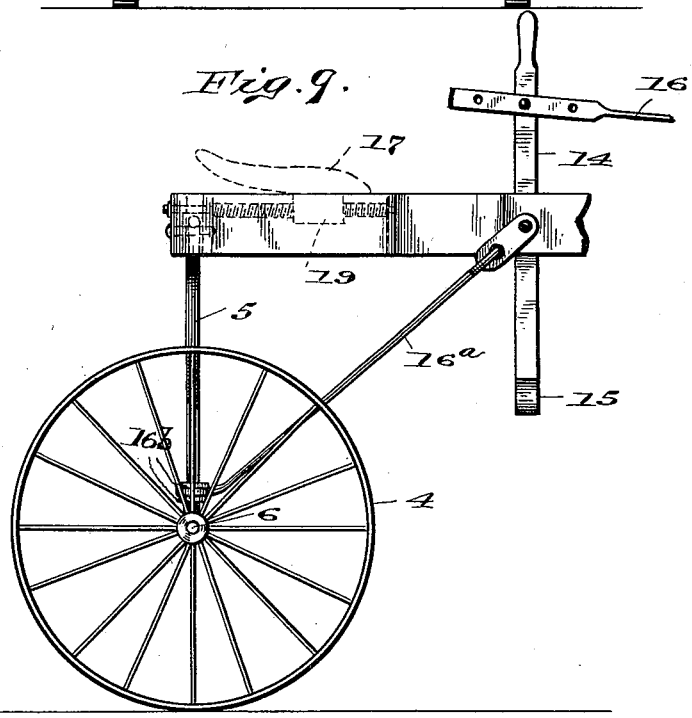
WITNESSES:
H. D. Nealy
J. Ringland.
INVENTOR
Arnold Wilkinson
BY
Thompson R Bell
ATTORNEY.

United States Patent Office.

ARNOLD WILKINSON, OF NEW CASTLE, INDIANA.

CULTIVATOR.

SPECIFICATION forming part of Letters Patent No. 630,788, dated August 8, 1899.

Application filed January 4, 1896. Serial No. 574,385. (No model.)

*To all whom it may concern:*

Be it known that I, ARNOLD WILKINSON, a citizen of the United States, residing at New Castle, in the county of Henry and State of Indiana, have invented new and useful Improvements in Cultivators, of which the following is a specification.

My improvements consist in the manner in which the main frame of the implement is supported upon its axes, the connection therewith of the cultivator-gangs, means whereby the said gangs are independently manipulated, and means for guiding and controlling the implement and operating parts thereof, all of which are hereinafter fully described and specifically claimed.

Referring to the drawings, Figure 1 is a longitudinal sectional elevation of my cultivator. Fig. 2 is a plan thereof with cultivator-points omitted. Fig. 3 is a detail view of one of the cultivator-gangs. Fig. 4 is a broken perspective view showing the adjustable and pivotal end of the radial arm of the cultivator. Fig. 5 is a broken rear portion of the frame with an adjustable seat mounted thereon. Fig. 6 is a broken sectional view showing the upper part of the rear axle and pivot connection. Fig. 7 is a broken longitudinal section of the frame and the draw-bar pivotally connected therewith. Fig. 8 represents the rear end of the cultivator, and Fig. 9 is a side view of same.

The outline of the main frame 1 is preferably that of a hexagon, the forward portion of which is supported by guiding-wheels 2, journaled on the independent axles 3, while the rear end of the said frame is pivotally connected with the upper part of an arched axle 5. The axles 3 have their vertical parts journaled in the side bearings 8 9 of the frame 1, and each is provided with inwardly-projecting steering-arms 10, having eyes 11 for connection by rods 13 with a steering-lever 12, as shown in Fig. 2.

Guide-levers 14 are pivotally secured to the main frame at points convenient to the operator's seat. The lower ends of the said levers are of stirrup form and form supports for the feet of the operator, and thus enable him to operate same and relieve his hands and arms. The levers 14 are connected with the guide-lever 12 by connecting-rods 16, a series of holes being made in the ends of the levers 14, as well as in the ends of the connecting-rods 16, to permit of a proper adjustment thereof.

The rear supporting-axle 5 has the crown of its arch made in the form of an inverted Y to receive a longitudinal pin, whereby it is pivotally connected with the rear of frame 1, so as to allow the said frame to maintain a horizontal position, as shown. The lower portions of the axle 5 are provided with braces 16$^a$, the forward ends of which are pivotally connected with the sides of the main frame, so as to prevent the twisting or turning of the axle 5. The rear ends of said braces are adapted to have a limited movement on the axle between the collars 16$^b$ thereof.

The operator's seat 17 is mounted on the upper part of the rear end of the frame and is adapted to be moved forward or backward by a traversing screw 18, fitted in a lug 19, formed at the bottom of said seat.

A clamp 20 is secured to the main brace 21, at or near the outer end thereof, and between the clamp proper is pivotally secured the rear end of a draw-bar 22, which projects forward to the front part of the frame, where it is bent downward to receive a stiffening-brace 23, the connection being made by rivets or bolts, as required. The front end of the draw-bar 22 and the braces 23 are bent to form a hitching-fork, between which the draft mechanism is secured by a suitable pin or bolt inserted in the holes 24, formed therein.

By referring to Fig. 2 it will be seen that no matter what position the draft-bar 22 is in the frame may be moved either in a line at right angles to the direction of the draft-bar, for the reason that the said bar is pivotally connected with the center of the main frame and at the rear end. Thus if the direction of the draft is along the line of the arrow *b* the direction of the movement of the implement may be in line with the arrow *a*, which motion is produced by moving the wheels into the position shown in dotted lines by means of the steering-levers 14.

The digging mechanism consists of a series of cultivator-points 25, secured to the lower ends of the semicircularly-bent spring-bars 26, the said bars being secured at their upper ends to the gang-bars 27 in such manner that the inner points are slightly in advance of its next adjacent point. The gang-bars 27 are secured on the rear ends of the swinging bars 28, each of which has its forward end pivoted on the outwardly-bent ends of the forward-depending braces 29 and is adjustably held in position by the brace-clamps 30. The rear ends of braces 31 are secured to the bearings 9 and have their forward ends threaded and passed through the ends of clamp 30, and on these threaded ends are fitted nuts 30$^a$, which are adapted to compress the ends of said clamps and hold them on the braces 29. The positions of the plows relatively to the ground and the depth of penetration are regulated by levers 32, in the crank ends of which are loosely fitted the suspension-bolts 34, the lower ends of which are pivotally connected with the gang-bars 27. Between the crank ends 33 of the levers 32 and beams 27 are interposed compression-springs 35, which are provided for the purpose of affording a yielding resistance to the upward movement of the plow-gangs when they may contact with any unyielding obstruction. The levers 32 are held in position by means of latches 36, which are adapted to engage the notches of segments 37, as shown. The plow-gangs being ahead of the operator's seat, he is at all times in position to direct the machine as required and to regulate the plows as occasion may require. Thus when the operator desires to move the plow-gangs to the left (see Fig. 2) he manipulates the steering mechanism by the stirrup ends of the levers 14, his hands being free to grasp the levers 32, whereby the plow-gangs are raised or lowered to the position required.

One particular feature of this invention is the construction of the draw-bar, which is so arranged that it will at all times swing or adjust itself to the line of direction of draft.

Having described my invention, what I claim as new, and desire to secure by Letters Patent, is—

In a cultivator, the combination with the main frame and its forward carrying and guiding wheels, of the rear carrying-wheels and arched axle thereof, a horizontal pin connecting the axle and frame, and a pair of side braces for preventing twisting of the axle, as set forth.

In testimony whereof I have hereunto set my hand in the presence of two subscribing witnesses.

ARNOLD WILKINSON.

Witnesses:
JAMES L. WATKINS,
ENOCH A. NATION.